E. C. Darling,
Truss.
Nº 3,812.   Patented Nov. 6, 1844.
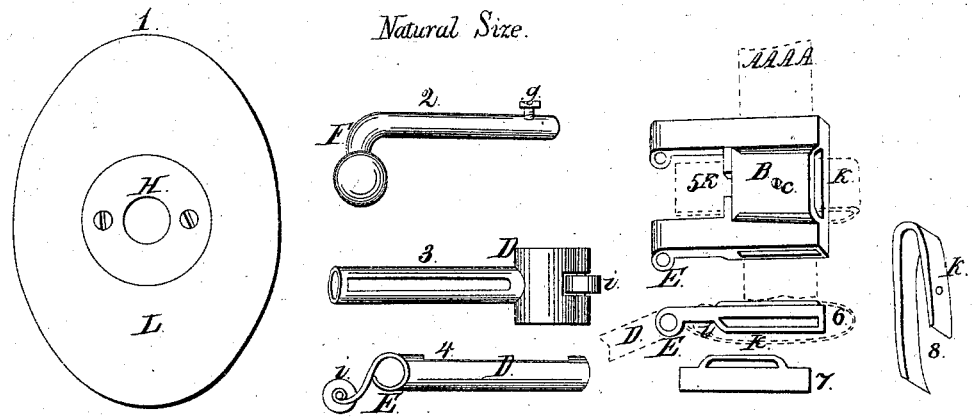
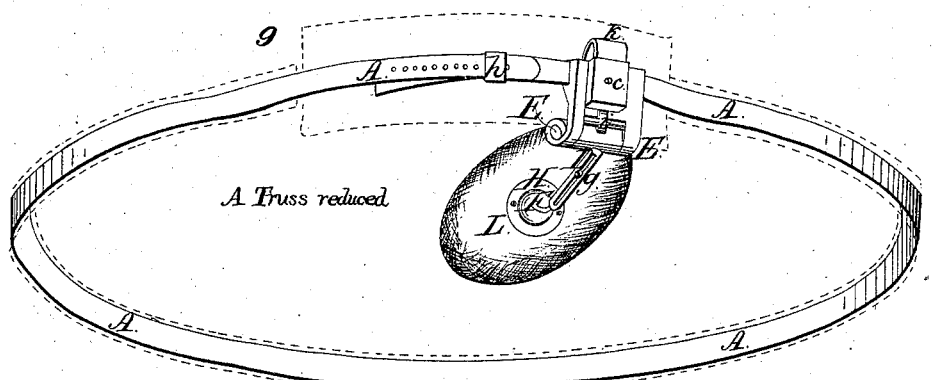
A Truss reduced.
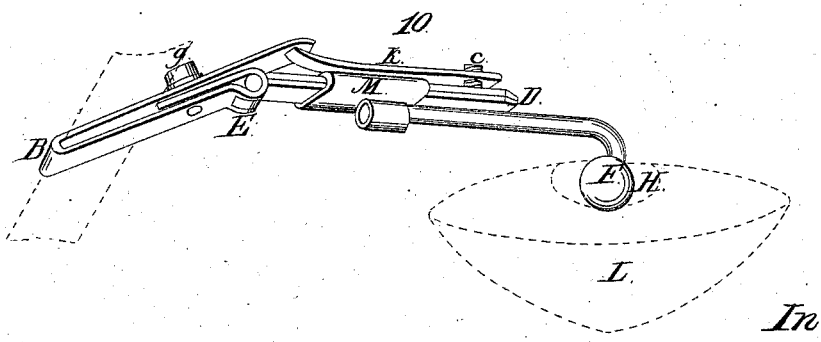
Inventor.
E. C. Darling

UNITED STATES PATENT OFFICE.

E. C. DARLING, OF NEW ORLEANS, LOUISIANA.

TRUSS.

Specification of Letters Patent No. 3,812, dated November 6, 1844.

*To all whom it may concern:*

Be it known that I, ELIAKIM C. DARLING, of the city of New Orleans, State of Louisiana, have invented a new and useful Improvement in Trusses for the Treatment and Cure of Hernia, the nature of my invention consisting, first: In place of the long metallic spring used in other trusses I provide a band of any suitable metal, copper, brass plated, or silver being preferred, of sufficient length so as to entirely encircle the body and a few inches over. (See drawing, A A A A, Figure 9.) This band is bent to a shape to fit around the hips of the wearer, and is fastened in front by means of holes in one end thereof and a pin in the other end, with a slide strap $h$ to keep the pin in any hole, as may be required. Second, in the use of a ball and socket or universal joint on the pad or block of truss, so that the pad or block may bear the same on the part it is applied to in every position of the wearer.

To enable others skilled in the art to make and use my invention I will proceed to describe its construction and operation.

I provide the band A A A A Fig. 9 with the means of fastening all as above described. On the band a metallic sliding piece B Fig. 5 is placed which is fastened to its place on the said band by the set screw C. To the sliding piece B is fastened with a hinge a socket or tube piece D so as to move freely back and forward according to the motion of the wearer. The socket or tube is about one and one-half inches in length and is round of sufficient size to contain the shank of the ball hereinafter described. The said hinge is formed by the connection of the slide piece B and socket or tube D by a pin at E. The ball and its shank F, Fig. 2 is a piece of round wire of sufficient size to fill the tube D and is bent to the shape as seen in drawing Fig. 2, and is fastened with a set screw G that passes through a mortise in the side of the tube, thus making the distance from the band to the block or pad adjustable. The ball and socket or universal joint is attached to the center of the block or pad as shown at A F in truss reduced.

H represents a plate or ring screwed to the block or pad L to fasten the ball F in its socket.

In the top of the tube D as seen in Fig. 3 a friction roller is placed. This roller bears against a spring whose form is seen in Fig. 8. The top of this spring is shown at K Fig. 5, by the dotted line. The spring K is fastened to the sliding piece B by encircling the short end thereof in the mortise represented in the top view of the sliding piece B as seen in Fig. 7 and is fastened by the set screw C passing through it as seen in Fig. 5. The long end of the spring extends to the hinge joint at E as represented by the dotted lines K Fig. 6, which dotted lines also represent the friction roller in tube D as bearing against the spring K at I.

Fig. 1 is the pad or block with the socket for the ball F or place for the universal joint attached. Fig. 2 is the ball and its shank with set screw G. Fig. 3 is a front view of the socket or tube piece D, with the friction roller I. Fig. 4 is a side or edge view of the same. Fig. 5 is a front perspective view of the slide pin B. Fig. 6 is an edge view of the slide pin B showing the manner in which the spring K and tube D is attached, also the manner in which the friction roller bears against the spring as seen at $i$ in dotted lines. Fig. 7 is a top view of the slide piece B showing the mortise for the end of the spring as above described. Fig. 8 is a perspective view of the spring K with hole $c$ for the set screw C. The dotted lines Fig. 9 shows the covering of the band.

The block or pad is either wood or leather and stuffed very hard and properly shaped to fit the parts it is to be applied to.

The operation and advantages of this truss are the non-extension of the band by moisture on use, the free movement that enables it to conform to all the motions of the body of the wearer and the facility of adjusting the different parts so as to fit all conditions of hernia, its simplicity and its non-liability to get out of order, the little inconvenience in its use and easily kept in its place around the hips without tight pressure.

I do not confine myself to the particular arrangement described. Fig. 10 being a modification of all the parts marked and represented by the figures 1, 2, 3, 4, 5, 6, 7, 8 and is described as follows: B is a modification of the sliding pin B as above described.

$g$ is the set screw to fasten it on the band; K the spring with the set screw C to fasten it in its place; D the modification of the tube or socket piece D and is a flat piece of metal. E is the hinge that connects the slide pin B and socket piece D. F is the ball and its shank and is of round wire bent as represented. M is a slide to move on the piece D instead of the shank of the ball as described above; H F the ball and socket or universal joint at the center of the block or pad, which is shown by the dotted lines L.

I don't confine myself to any particular metal as a variety may be used and the truss would still be effective.

I do not claim as my invention the several parts marked 1, 2, 3, 4, 5, 6, 7, 8 or the arrangement; but What I do claim as my invention and wish to secure by Letters Patent is—

The use of a continuous metallic band entirely encircling the body and fastening in itself and of such material as not to stretch by use but of such malleability as to allow any person to shape it to themselves at pleasure, thereby doing away with the use of leather or other straps of stretchy material.

E. C. DARLING.

Witnesses:
WILLIAM FAY,
WILLIAM MENNEY.